US008150767B2

(12) United States Patent
Wankmueller

(10) Patent No.: US 8,150,767 B2
(45) Date of Patent: Apr. 3, 2012

(54) SYSTEM AND METHOD FOR CONDUCTING ELECTRONIC COMMERCE WITH A REMOTE WALLET SERVER

(75) Inventor: John Wankmueller, New Hyde Park, NY (US)

(73) Assignee: MasterCard International Incorporated, Purchase, NY (US)

(*) Notice: Subject to any disclaimer, the term of this patent is extended or adjusted under 35 U.S.C. 154(b) by 1413 days.

(21) Appl. No.: 09/783,775

(22) Filed: Feb. 15, 2001

(65) Prior Publication Data

US 2001/0027441 A1 Oct. 4, 2001

Related U.S. Application Data

(60) Provisional application No. 60/182,928, filed on Feb. 16, 2000.

(51) Int. Cl.
*G06Q 40/00* (2012.01)
*G06F 21/00* (2006.01)

(52) U.S. Cl. .............................. 705/41; 705/39; 705/65

(58) Field of Classification Search ............. 705/39-45, 705/26

See application file for complete search history.

(56) References Cited

U.S. PATENT DOCUMENTS

| | | | | |
|---|---|---|---|---|
| 5,590,197 | A * | 12/1996 | Chen et al. | 705/65 |
| 5,761,306 | A | 6/1998 | Lewis | 380/21 |
| 5,781,723 | A * | 7/1998 | Yee et al. | 726/20 |
| 5,790,677 | A | 8/1998 | Fox et al. | 380/24 |
| 5,883,810 | A | 3/1999 | Franklin et al. | 364/479.02 |
| 5,898,154 | A | 4/1999 | Rosen | 235/379 |
| 6,016,963 | A * | 1/2000 | Ezawa et al. | 235/492 |
| 6,170,058 | B1 * | 1/2001 | Kausik | 713/193 |
| 6,227,447 | B1 | 5/2001 | Campisano | 235/380 |
| 6,272,913 | B1 * | 8/2001 | Naegele et al. | 73/114.31 |
| 6,434,238 | B1 * | 8/2002 | Chaum et al. | 380/45 |
| 6,575,372 | B1 * | 6/2003 | Everett et al. | 235/492 |
| 6,601,761 | B1 * | 8/2003 | Katis | 235/379 |
| 6,681,328 | B1 * | 1/2004 | Harris et al. | 713/175 |
| 6,808,111 | B2 * | 10/2004 | Kashef et al. | 235/380 |
| 7,206,769 | B2 * | 4/2007 | Laurent et al. | 705/65 |
| 7,343,351 | B1 * | 3/2008 | Bishop et al. | 705/67 |
| 7,366,703 | B2 * | 4/2008 | Gray et al. | 705/78 |
| 2001/0008012 | A1 * | 7/2001 | Kausik | 713/156 |
| 2001/0011250 | A1 * | 8/2001 | Paltenghe et al. | 705/41 |
| 2001/0021927 | A1 * | 9/2001 | Laurent et al. | 705/65 |
| 2001/0027441 | A1 * | 10/2001 | Wankmueller | 705/41 |
| 2001/0034719 | A1 * | 10/2001 | Durand et al. | 705/65 |

(Continued)

FOREIGN PATENT DOCUMENTS

EP 0917119 5/1999

(Continued)

OTHER PUBLICATIONS

First SET transaction on the internet; Anonymous; Financial Technology International Bulletin; v14n5; Jan. 1997; 2-pages.*

(Continued)

*Primary Examiner* — Gregory Johnson
(74) *Attorney, Agent, or Firm* — Baker Botts L.L.P.

(57) ABSTRACT

A method is provided for conducting a transaction over a computer network (such as the Internet) where the remote wallet server conducts a transaction with a merchant computer in a format substantially compliant with a chip card electronic commerce protocol or specification, regardless of whether or not the payment card of the consumer involved in the transaction is a chip card.

6 Claims, 2 Drawing Sheets

U.S. PATENT DOCUMENTS

| | | | | |
|---|---|---|---|---|
| 2001/0037312 | A1 * | 11/2001 | Gray et al. | 705/67 |
| 2001/0042051 | A1 * | 11/2001 | Barrett et al. | 705/65 |
| 2001/0044785 | A1 * | 11/2001 | Stolfo et al. | 705/74 |
| 2002/0004783 | A1 * | 1/2002 | Paltenghe et al. | 705/41 |
| 2002/0038287 | A1 * | 3/2002 | Villaret et al. | 705/41 |
| 2002/0040936 | A1 * | 4/2002 | Wentker et al. | 235/492 |
| 2002/0042776 | A1 * | 4/2002 | Woo et al. | 705/40 |

FOREIGN PATENT DOCUMENTS

| | | |
|---|---|---|
| EP | 0950972 | 10/1999 |
| WO | 9849658 | 11/1998 |
| WO | 9910850 | 3/1999 |

OTHER PUBLICATIONS

Credit card firms plan “digital money” future; Messmer, Ellen; Network World v12n17; Apr. 24, 1995; 3-pages.*

CyberCash to Offer Yen-based Internet Transactions in Japan; Creates CyberCash K.K. Joint Venture with Japanese Partners; PRNewswire; Aug. 11, 1997; 2-pages.*

Debit Cards on the Internet; Credit Card Management , v 12 , n 8; Nov. 1999; 6-pages.*

How Will Kids Pay Online?; Digital Kids Report , p. N/A; Jun. 1 , 1997; 3-pages.*

Mondex spreads its wings; Lunt, Penny; ABA Banking Journal v88n2; Feb. 1996; 3-pages.*

Risks and Potentials of Using EMV for Internet Payments; Els Van Herreweghen; USENIX Workshop on Smartcard Technology; May 1999, 12-pages.*

EMV ’96 Integrated Circuit Card Application Specification for Payment Systems; Version 3.0; Jun. 30, 1996; 58-pages.*

The SET Standard Book 1 Business Description: *SET Secure Electronic Transaction Specification, Book 1: Business Description*, Version 1.0, May 31, 1997, available at www.setco.org/download.html.

The SET Standard Book 2 Programmer’s Guide: *SET Secure Electronic Transaction Specification, Book 2: Programmer’s Guide*, Version 1.0, May 31, 1997, available at www.setco.org/download.html.

The SET Standard Book 3 Formal Protocol Definition: *SET Secure Electronic Transaction Specification, Book 3: Formal Protocol Definition*, Version 1.0, May 31, 1997, available at www.setco.org/download.html.

*EMV ’96 Integrated Circuit Card Specification for Payment Systems*, Version 3.1.1, May 31, 1998, available at www.emvco.com/specifications.cfm.

*EMV ’96 Integrated Circuit Card Terminal Specification for Payment Systems*, Version 3.1.1, May 31, 1998, available at www.emvco.com/specifications.cfm.

*EMV ’96 Integrated Circuit Card Application Specification for Payment Systems*, Version 3.1.1, May 31, 1998, available at www.emvco.com/specifications.cfm.

*EMV ’96 Chip Electronic Commerce Specification*, Version 1.0, Dec. 1999, available at www.setco.org/download.html.

* cited by examiner

SYSTEM AND METHOD FOR CONDUCTING ELECTRONIC COMMERCE WITH A REMOTE WALLET SERVER

PRIORITY APPLICATION

This application claims priority to U.S. provisional application 60/182,928, filed on Feb. 16, 2000, and entitled "System and Method for Conducting Electronic Commerce With A Promote Wallet Server," which is hereby incorporated by reference.

BACKGROUND OF THE INVENTION

This invention relates to a method and system for conducting electronic commerce with a remote wallet server.

Electronic commerce over the Internet, and especially the World Wide Web portion of the Internet, is growing at a phenomenal rate. Merchants are taking advantage of the popularity of the World Wide Web by creating online catalogs on web sites, through which consumers can browse and order the merchants' products and services.

In a typical online transaction over the Internet, a consumer will browse a merchant's web site, identify items of interest, and add those items to the consumer's electronic shopping cart. When a consumer is ready to order, the consumer presses an order button, and a merchant sends the consumer a completed order form (typically an HTML-based form) to review and approve. If the consumer desires to complete the order, the consumer fills in the order form with payment and shipping information and returns the form to the merchant.

A disadvantage to the typical process of conducting transactions over the Internet is that the data format used in the merchant HTML-based order forms varies considerably between merchants, and the consumer must therefore re-enter the same payment and shipping information for each merchant at which the consumer shops. Many consumers find the diversity of forms confusing and the process of manually filling in these forms tedious.

In an effort to make online shopping more convenient for consumers, some companies have developed software applications called digital wallets. A digital wallet may store payment and shipping information on a consumer's computer and to use this information to automatically complete a merchant's order form. The digital wallet thus frees the consumer from having to manually re-enter payment and shipping information each time that the consumer makes an online purchase. Digital wallets have been developed as stand-alone applications, as helper applications to browsers, and as browser plug-ins.

Because of the anonymous and open nature of the Internet, electronic commerce over the Internet raises concerns regarding the confidentiality and integrity of transmitted data and the proper authentication of parties involved in a transaction. Various methods of addressing these concerns have been developed and proposed. One such method is the SET™ protocol, which is promulgated and managed by SET Secure Electronic Transaction LLC (www.setco.org). The SET protocol is an open technical standard for the commerce industry developed by MasterCard™ International Inc. and others as a way to facilitate secure payment card transactions over the Internet. SET utilizes cryptography to ensure confidential and secure transmissions of data and digital certificates to create a trust chain throughout the transaction, verifying cardholder and merchant identities. The SET protocol is invoked after a consumer has completed the payment and other information on an order form and is ready to return the order form to the merchant.

Typically, a digital wallet will include application code to perform encryption to ensure the confidentiality and integrity of payment information transmitted during an online transaction. For example, a digital wallet may contain application code to perform the SET protocol. The digital wallet may also include application code for transmitting information according to a standard electronic commerce protocol, such as the Electronic Commerce Modeling Language (ECML). The digital wallet may also include a digital certificate, which may be used to authenticate a consumer. The application code to perform these functions, especially the encryption function, may be lengthy. Therefore, a consumer may find the time to download digital wallet software over the Internet to be inconveniently long.

To shorten the time required for downloading a digital wallet, remote wallet servers have been developed. A remote wallet server is a server that is remote from a consumer's computer and that stores the bulk of the application code for a digital wallet. The remote wallet server may also remotely store the consumer's payment and shipping information. When a remote wallet server is used, a consumer need only store a "thin" client application on his or her computer that communicates with the remote wallet server when the consumer is ready to complete an order with a merchant. The remote wallet server then acts as a proxy for the consumer, sending payment and other purchase-related information to the merchant.

A problem that arises in connection with the use of a remote wallet server is how to authenticate the remote wallet server (which acts as a proxy for the cardholder) to the merchant. Assuming that a digital certificate approach (such as that used by SET) is used between a consumer and a merchant, it has been proposed that the remote wallet server store the consumer's authentication key (i.e., the private key of a cryptographic public key pair used for digital signatures) and the consumer's digital certificate. This approach is problematic because a remote wallet server may provide service to potentially millions of consumers. Therefore, using this approach, the remote wallet server would be required to store potentially millions of authentication keys and digital certificates. This approach is undesirable because it imposes enormous, secure storage requirements on the remote wallet server and because the storage of a large number of consumers' sensitive information (i.e., authentication keys) in one place poses great security concerns.

Another approach that has been proposed is for the remote wallet server to hold a set of its own authentication keys. Each authentication key in the set would be associated with multiple consumers. For example, if a remote wallet server provides service to one million consumers and holds a set of one thousand authentication keys, each authentication key could be associated with a thousand consumers. While this approach would allow the remote wallet server to store many fewer keys than the previous approach, the remote wallet server would still be required to store individual certificates for each consumer (since each certificate would contain individual consumer account information). This approach also has security concerns.

Another approach that has been proposed is for the remote wallet server to store the private key of a recognized certificate signing entity, such as the financial institution that issues a consumer's payment card. The remote wallet server could then generate consumer digital certificates "on the fly" using the certificate signer's private key. While this approach eliminates the need for the remote wallet server to store consumer authentication keys and digital certificates, it raises other concerns. First, since the confidentiality of the private key of the certificate signer (e.g., issuing bank) is of utmost importance to establish trust in a certificate signed by the certificate signer, it is against the certificate signer's interest to share this private key with any other entity. Second, since public key pairs may have expiration dates, the remote wallet server may periodically, in a secure manner, need to be updated with a new version of the certificate signer's private key. Third, generating certificates on the fly could cause increased transaction processing times.

Yet another approach that has been proposed, in the case where a consumer uses an integrated circuit card (also referred to as a "chip card" or "smart card") as a payment card for an online transaction, is for the remote wallet server to simply pass a cryptogram generated by the consumer chip card to the merchant. The cryptogram will then be forwarded to the financial institution that issued the chip card. Since the chip card shares a secret with the card issuing institution (such as a DES cryptographic key) that it uses to generate the cryptogram, the identity of the chip card holder may be authenticated by the card issuing institution. A disadvantage to this approach, however, is that the cryptogram does not provide any information related to the remote wallet server involved in the transaction. In addition, this approach obviously does not apply to any transactions that do not involve chip cards. Since payment chip cards are not currently widespread, this approach currently does not have wide applicability.

Accordingly, there exists a need for a method and system for authenticating a remote wallet server during an online transaction that substantially improves on the approaches discussed above.

SUMMARY OF THE INVENTION

It is an object of the present invention to provide an improved system and method for authenticating a remote wallet server during on online transaction. According to an exemplary embodiment of the present invention, there is provided a method for conducting a transaction over a computer network (such as the Internet) where the remote wallet server conducts a transaction with a merchant computer in a format substantially compliant with a chip card electronic commerce protocol or specification, regardless of whether or not the payment card of the consumer involved in the transaction is a chip card.

According to one aspect of the present invention, the remote wallet server and an issuer institution (such as a bank) have a shared secret data object (such as a cryptographic key), and the method of the present invention includes the steps of generating a cryptogram by the remote wallet server based on the shared secret data object and sending payment-related information and the cryptogram by the remote wallet server to the merchant computer during an online transaction. The merchant computer may then forward the cryptogram, through an existing payment infrastructure, to the issuer institution, which decrypts the cryptogram and authorizes or rejects the transaction.

Advantageously, the present invention allows the authentication of remote wallet servers to be seamlessly integrated into existing payment infrastructures and to utilize existing point-of-sale chip card transaction methodologies. With the present invention, an issuer bank need only issue the cryptographic equivalent of a consumer chip card to a remote wallet server, where the chip card is approved by the issuer bank for the capture and storage of consumer payment accounts used in electronic commerce. For issuing institutions that already have the infrastructure to support consumer chip card transactions, no new infrastructure is needed to support the authentication of transactions initiated by remote wallet servers utilizing the present invention.

BRIEF DESCRIPTION OF THE DRAWINGS

Exemplary embodiments of the present invention will now be described in detail with reference to the accompanying drawings in which.

DETAILED DESCRIPTION

Figure 1:
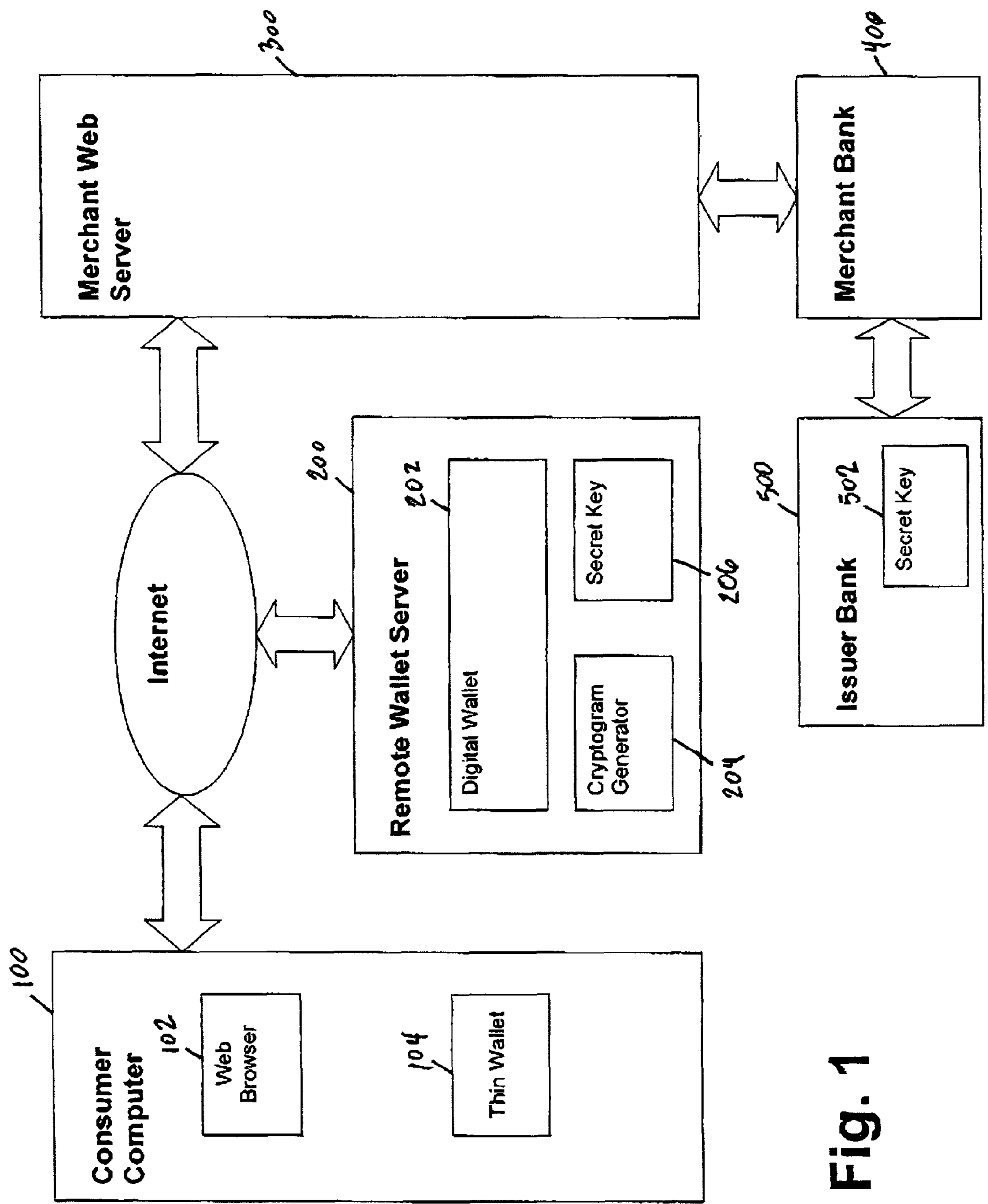
FIG. 1 is a block diagram of a system for conducting electronic commerce according to a exemplary embodiment of the present invention.

FIG. 1 is a block diagram of a system for conducting electronic commerce according to a exemplary embodiment of the present invention. The system includes a consumer computer 100, a remote wallet server 200, a merchant web server 300, a merchant bank computer 400, and an issuer bank computer 500.

The consumer computer 100 includes a web browser 102 for browsing web pages on the Internet, such as a merchant's web site. The consumer computer 100 also includes a thin wallet application 104 that allows the consumer computer 100 to communicate with the remote wallet server 200. The thin wallet application 104 may be a stand-alone application, a helper application to the web browser 102, or a plug-in for the web browser 102.

The remote wallet server 200 includes a digital wallet application 202, which provides payment fimctionality for one or more consumers. The remote wallet server 200 also includes a secret cryptographic key 206, which is shared with the issuer bank computer 500. The issuer bank computer 500 has secret cryptographic key 502, which is a copy of the secret key 206. The remote wallet server also includes a cryptogram generator 204, which uses the secret key 206 to generate a cryptogram.

The merchant web server 300 hosts a web site for the merchant, which includes the merchant's online catalog of goods and/or services. The consumer computer 100, remote wallet server 200, and the merchant web server 300 are able to communicate with each other over the Internet.

The merchant bank computer 400 is operated by or on behalf of a bank that holds a financial account of the merchant. For example, the merchant bank computer may be operated by a third party processor that the merchant bank has designated for processing of payment card authorizations. The merchant web server 300 is able to communicate with the merchant bank computer 400 either through the Internet or other communications link.

The issuer bank computer 500 is operated by or on behalf of the bank that issued the payment card of the consumer. The merchant bank computer 400 (or third party payment processor designated by the merchant bank) and the issuer bank computer 500 are able to communicate with each other through a payment system network.

Figure 2:
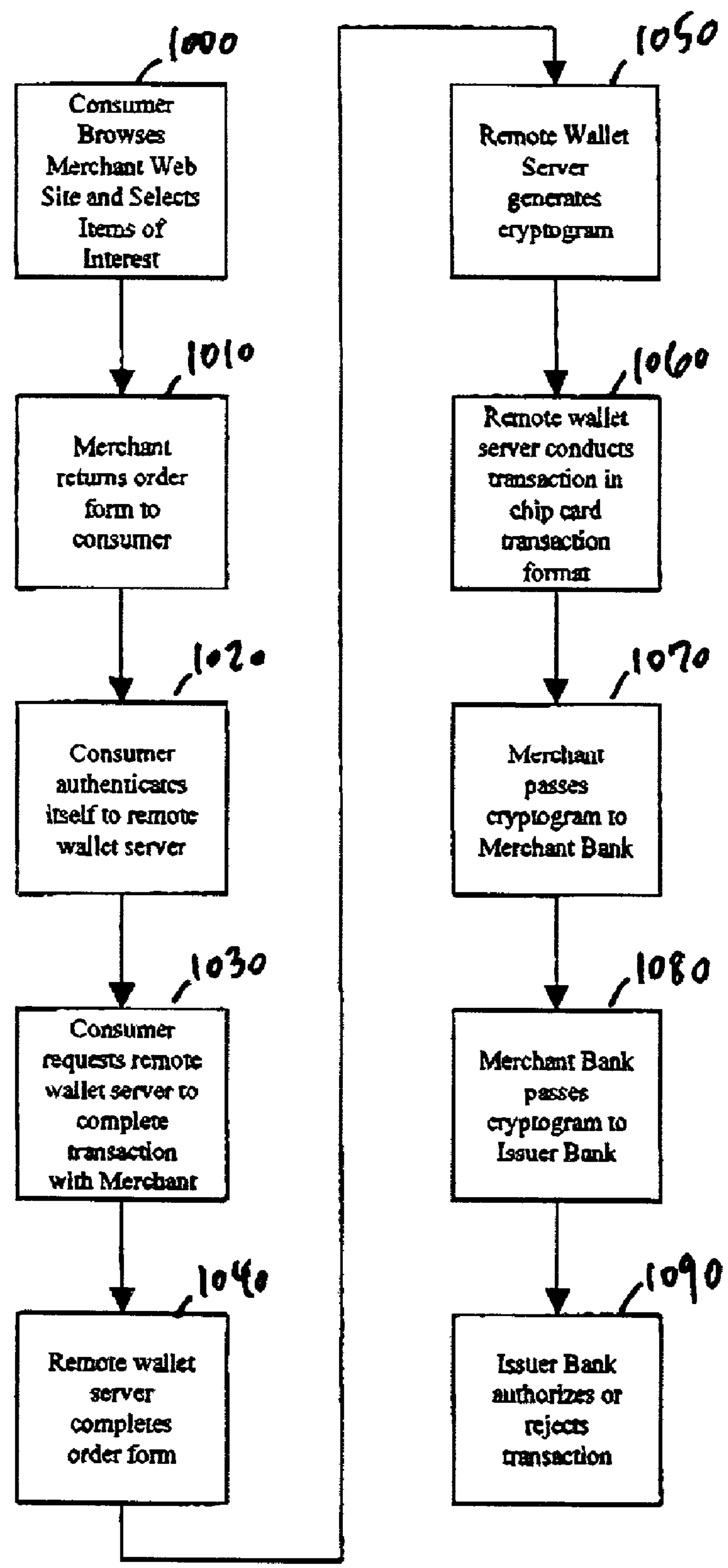
FIG. 2 is a flow chart of a method of conducting electronic commerce according to an exemplary embodiment of the present invention.

FIG. 2 is a flow chart of an exemplary method of conducting electronic commerce using the system of FIG. 1. In step 1000, the consumer browses the merchant's online catalog using the web browser 102. The consumer may select items of interest and place them in his or her electronic shopping cart. When the consumer is finished browsing and selecting items, the consumer presses an order button to indicate to the merchant that the consumer desires to place an order.

In step 1010, in response to the pressing of the order button in step 1000, the merchant sends the consumer an order form (which is typically an HTML-based form), with fields for the entry of payment and shipping information. In step 1020, the consumer computer 100, using the thin wallet application 104, authenticates itself to the remote wallet server 200. The method of authentication between the consumer computer and the remote wallet server is not addressed by the present invention and may be performed by any means known in the art, such as with the use of public key cryptography, shared symmetric cryptographic keys, or other proprietary authentication methods, including chip card authentication methods.

After the consumer computer has authenticated itself to the remote wallet server, the consumer computer sends the order form to the remote wallet server and requests that the remote wallet server complete the transaction with the merchant. It is noted that the consumer payment and shipping information may be stored on either the consumer computer 100 or the remote wallet server 200. If the payment and shipping information is stored on the consumer computer, the consumer computer will send this information to the remote wallet server with its request. If the payment and shipping information is stored on the remote wallet server, the consumer computer need not send this information to the remote wallet server with its request.

In step 1040, the remote wallet server fills in the information on the order form, if necessary. In step 1050, the cryptogram generator 204 of the remote wallet server generates a cryptogram using the secret key 206. The cryptogram generator 204 may be a software application or it may be a dedicated circuit within the remote wallet server 200. Preferably, the cryptogram generator 204 and the secret key 206 are contained in a tamper-resistant hardware security module, which offers physical protection for the keys stored inside it. The cryptogram generator 204 may utilize any well-known cryptographic algorithm, such as, for example, the triple DES algorithm. Typically, the cryptogram generated will include both consumer account and purchase information.

In step 1060, the remote wallet server continues the dialog with the merchant—i.e., sends the completed order form and the cryptogram to the merchant using a chip card protocol. For example, the remote wallet server may conduct the transaction with the merchant using the protocol specified in the *EMV* 96 *Chip Electronic Commerce Specification*, Version 1.0, December 1999 (available at http://www.emvco.com/specifications.cfm), which is incorporated by reference herein in its entirety. Thus, at the merchant computer, the transaction appears to involve a consumer chip card and is processed as such.

In step 1070, the merchant forwards the cryptogram to the merchant bank. In turn, in step 1080, the merchant bank forwards the cryptogram to the issuer bank. In step 1090, the issuer bank verifies the cryptogram and authorizes or rejects the transaction. The authorization or rejection is transmitted back to the merchant through the chain of communication.

Advantageously, as described above, the present invention allows the authentication of remote wallet servers using existing payment infrastructures and existing point-of-sale chip card based transaction methodologies. According to the present invention, a bank need only issue the cryptographic equivalent of a consumer chip card to a remote wallet server, and assuming the bank already has the infrastructure to support consumer chip card based transactions, no new infrastructure is needed to support the authentication of transactions initiated by the remote wallet server. Moreover, the present invention allows any technology to be employed between the consumer computer and the remote wallet server for authentication and communication.

Although the present invention has been described with reference to certain preferred embodiments, various modifications, alterations, and substitutions will be known or obvious to those skilled in the art without departing from the spirit and scope of the invention, as defined by the appended claims.

I claim:

1. A method for conducting a payment transaction over a computer network between a consumer and a merchant involving a payment card issued by an issuer institution to the consumer, wherein the computer network includes at least three computers connected thereto, a consumer computer operated by or on behalf of the consumer, a merchant computer operated by or on behalf of the merchant, and a wallet server at a location remote from said consumer that provides functionality for the consumer computer to conduct transactions over the computer network, and wherein the payment card is in a form of either a chip card or a non-chip card, the method comprising:

receiving a request at the remote wallet server from the consumer computer for conducting a payment function with the merchant computer;

in response to the request, conducting the payment transaction by the remote wallet server with the merchant computer in a format compliant with a chip card electronic commerce protocol or specification, wherein the remote wallet server and the issuer institution have a shared secret data object;

generating a cryptogram by the remote wallet server based on the shared secret data object between the remote wallet server and the issuer institution; and sending payment-related information and the cryptogram by the remote wallet server to the merchant computer in response to the request by the consumer computer.

2. A remote wallet server for facilitating a payment transaction over a computer network between a consumer and a merchant, wherein the transaction involves a payment card issued by an issuer institution to the consumer, wherein the payment card is in a form of either a chip card or a non-chip card, and wherein the computer network includes at least three computers connected thereto, a consumer computer operated by or on behalf of the consumer, a merchant computer operated by or on behalf of the merchant, and the wallet server at a location remote from said consumer; the remote wallet server comprising:

a microprocessor unit;

a memory unit coupled to the microprocessor unit;

means for conducting a payment function between the remote wallet server and the merchant computer in response to a request for such a function by the consumer computer wherein the payment transaction is conducted in a format compliant with a chip card electronic commerce protocol or specification;

a storage unit having stored therein a secret data object that is shared with the issuer institution;

means for generating a cryptogram by the remote wallet server based on the secret data that is shared between the remote wallet server and the issuer institution; and application code stored in the memory unit for sending payment-related information and the cryptogram to the merchant computer in response to the request by the consumer computer to conduct the payment transaction with the merchant computer.

3. The remote wallet server of claim 2, wherein the storage unit and the means for generating a cryptogram are contained in a tamper-resistant security module.

4. A method for conducting a payment transaction over a computer network between a consumer and a merchant involving a payment card issued by an issuer institution to the consumer, wherein the payment card is in a form of either a chip card or a non-chip card, wherein the computer network includes at least three computers connected thereto, a consumer computer operated by or on behalf of the consumer, a merchant computer operated by or on behalf of the merchant, and a wallet server at a location remote from said consumer that provides functionality for the consumer computer to conduct transactions over the computer network, wherein the remote wallet server and the issuer institution have a shared secret data object, the method comprising:

receiving a request by the remote wallet server from the consumer computer for conducting a payment function with the merchant computer;

generating a cryptogram by the remote wallet server based on the shared secret data object between the remote wallet server and the issuer institution, regardless of whether or not the payment card of the consumer involved in the payment transaction is a chip card or a non-chip card; and sending payment-related information and the cryptogram by the remote wallet server to the merchant computer in response to the request by the consumer computer, wherein the payment-related information and the cryptogram are transmitted in a format compliant with a chip card electronic commerce protocol or specification.

5. A remote wallet server for facilitating a payment transaction over a computer network between a consumer and a merchant involving a payment card issued by an issuer institution to the consumer, wherein the payment card is in a form of either a chip card or a non-chip card, wherein the computer network includes at least three computers connected thereto, a consumer computer operated by or on behalf of the consumer, a merchant computer operated by or on behalf of the merchant, and the wallet server at a location remote from said consumer, comprising:

a microprocessor unit;

a memory unit coupled to the microprocessor unit;

a storage unit having stored therein a secret data object that is shared with the issuer institution;

means for generating a cryptogram by the remote wallet server based on the secret data that is shared between the remote wallet server and the issuer institution, regardless of whether or not the payment card of the consumer involved in the payment transaction is a chip card or a non-chip card; and application code stored in the memory unit for sending payment-related information and the cryptogram to the merchant computer in response to a request by the consumer computer to conduct a payment function with the merchant computer wherein the application code includes means for transmitting the payment-related information and the cryptogram in a format compliant with a chip card electronic commerce protocol or specification.

6. The remote wallet server of claim 5, wherein the storage unit and the means for generating a cryptogram are contained in a tamper-resistant security module.

* * * * *